R. HENNIG.
REVERSIBLE VALVE GEAR FOR ELASTIC FLUID ENGINES.
APPLICATION FILED APR. 27, 1908.

935,500.

Patented Sept. 28, 1909.

3 SHEETS—SHEET 1.

Witnesses:

Inventor
Rudolf Hennig
By
James L. Norris
Atty

R. HENNIG.
REVERSIBLE VALVE GEAR FOR ELASTIC FLUID ENGINES.
APPLICATION FILED APR. 27, 1908.

935,500.

Patented Sept. 28, 1909.

3 SHEETS—SHEET 3.

Witnesses:

Inventor
Rudolf Hennig
By James L. Norris
Atty.

UNITED STATES PATENT OFFICE.

RUDOLF HENNIG, OF HAMBURG, GERMANY.

REVERSIBLE VALVE-GEAR FOR ELASTIC-FLUID ENGINES.

935,500.

Specification of Letters Patent. Patented Sept. 28, 1909.

Application filed April 27, 1908. Serial No. 429,427.

*To all whom it may concern:*

Be it known that I, RUDOLF HENNIG, a subject of the Emperor of Germany, residing at Hamburg, Germany, have invented certain new and useful Improvements in Reversible Valve-Gear for Elastic-Fluid Engines, of which the following is a specification.

The subject of the present invention is a reversible valve-gear for internal combustion engines, steam engines, air-compressors and the like, in which the valve-actuating shafts are mounted in a known manner, by means of levers carrying bearings at their free ends and hereinafter referred to as bearing-levers, on a reversing shaft so as to be capable of oscillating and can be adjusted or set for forward or backward motion or for running idle.

According to the present invention, these valve-actuating shafts are provided with cranks or eccentrics which, by means of connecting rods, drive pairs of roller-levers acting on the valves. On the valve-actuating shafts are mounted gear-wheels, which roll on gear-wheels mounted coaxially with the reversing shafts, so that the valve-actuating shafts are not only brought into another position by means of the reversal, but are also turned relatively to the driving crank-shaft or shafts of the engine.

Since internal combustion engines when starting must work as compressed air motors, so according to the present invention the exhaust-valve used in the normal running of the engine is simultaneously used as the exhaust member of the compressed-air valve-system. Thus for the compressed air driving, a separate valve-actuating shaft and also reversing gear for permitting forward and backward motion can be dispensed with. The compressed air valves are actuated in the available idle downward travel of the upper roller-lever from the gearing actuating the exhaust-valve, for which arrangement the observation that the opening and closing of the compressed-air-valve lies near the exhaust period, gave the suggestion.

By reason of its great range of admission, the new valve-gear can also be employed as suction-valve gearing in compressors, in addition to internal combustion engines and steam engines.

The gear is shown in the accompanying drawings, in which—

Figure 1:
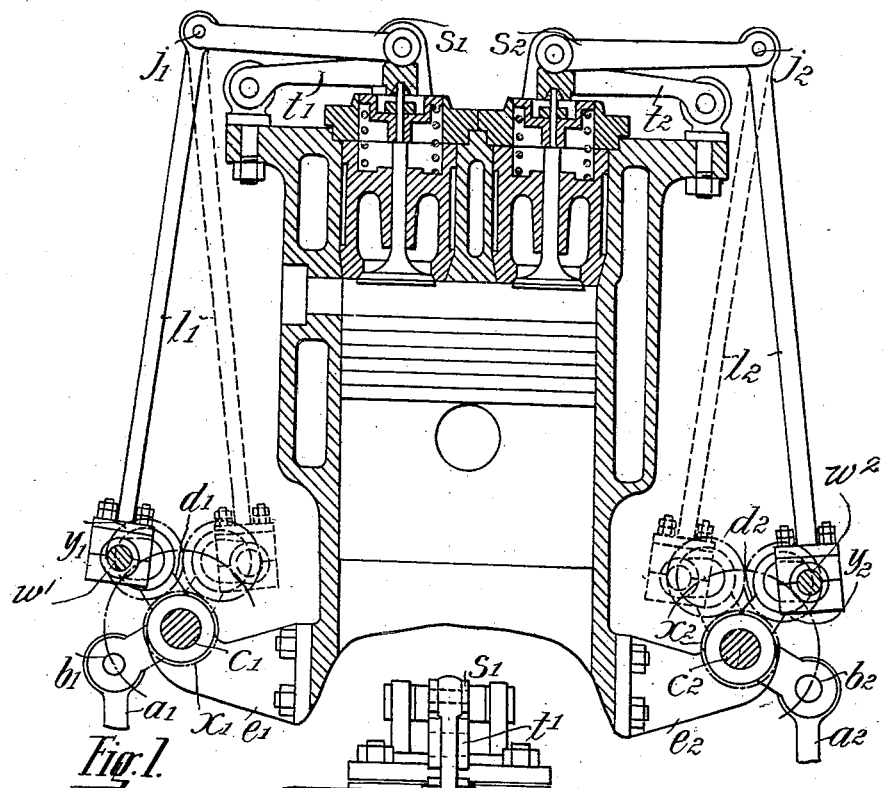
Figure 2:
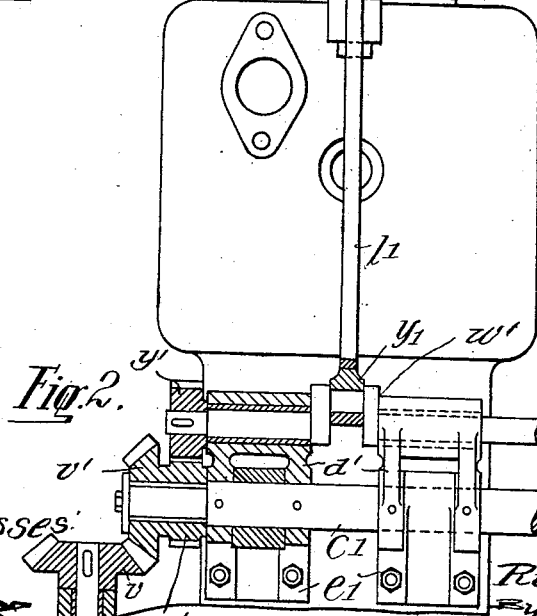
Figure 3:
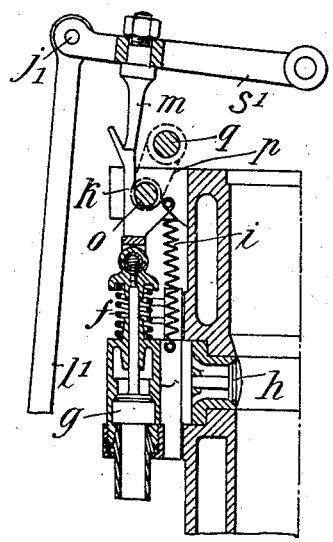
Figure 4:
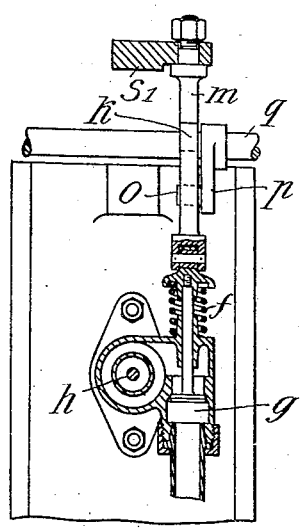
Figure 5:
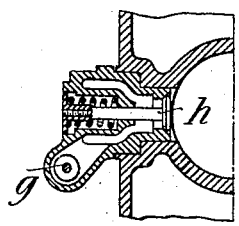
Figure 6:
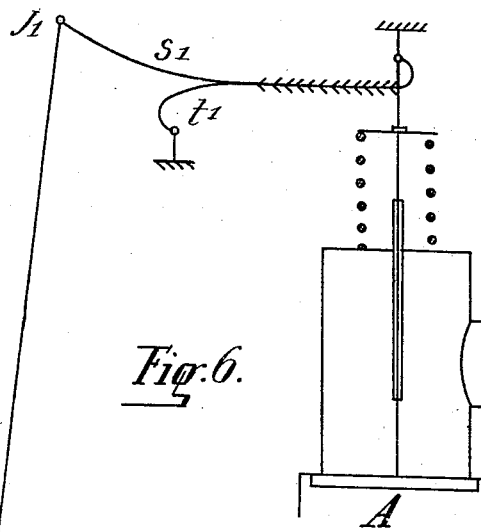
Figure 7:
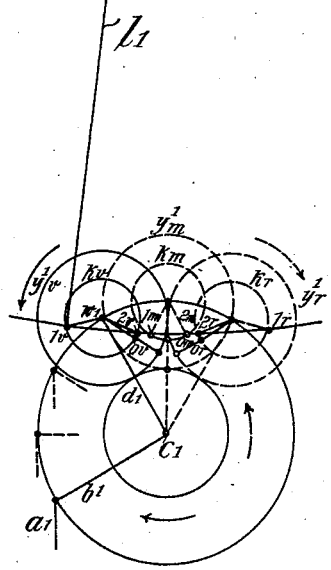
Figure 7:
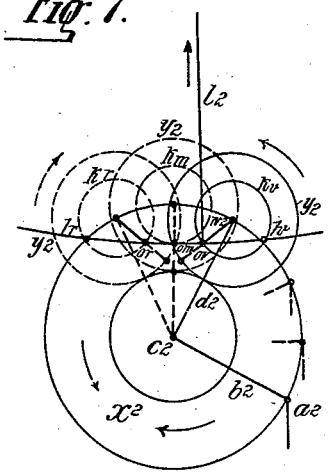

Figure 1 shows in vertical section a cylinder provided with the admission- and exhaust-valve gearing. Fig. 2 is a side elevation thereof. Figs. 3, 4 and 5 show the gearing for actuating the compressed-air starting-valve. Figs. 6 and 7 show diagrammatically the reversing gear for the admission- and exhaust-valves.

For the exhaust-valve gearing and for the admission-valve gearing, separate valve-actuating shafts $w'$ and $w^2$ are provided (Fig. 1), which are driven through gear-wheels $x'$, $y'$ and $x^2$, $y^2$ respectively from the crank-shafts. On account of the four-stroke-cycle, the valve-actuating shafts $w'$ and $w^2$ run at half the speed of the crank-shafts and in this case in the same direction. The cranks or eccentrics of the valve-actuating shafts $w'$ and $w^2$, by means of connecting rods $l'$, $l^2$, drive the pairs of roller-levers $s'$, $t'$ and $s^2$, $t^2$, which act on the valves.

The levers $s'$ and $s^2$ at their inner ends are secured to stationary pivots and at their outer ends are pivoted to the respective rods $l'$ and $l^2$. The levers $t'$ and $t^2$ are arranged directly under the corresponding levers $s'$ and $s^2$ and at their outer ends are secured to stationary pivots, their inner ends being related to the stems of the exhaust and admission valves in the manner shown in Fig. 1. Consequently, when either of the levers $t'$ and $t^2$ is depressed, the valve controlled thereby will be opened, springs being provided to restore the valves and the levers $t'$ and $t^2$ to initial position. The levers $t'$ and $t^2$ are positively depressed by the levers $s'$ and $s^2$ when the latter are moved downwardly. The levers $s'$ and $s^2$ are normally disposed angularly with respect to the corresponding levers $t'$ and $t^2$, the under faces of the former engaging the upper faces of the latter. In Fig. 1, the valves are shown as closed and the levers $s'$ and $s^2$ are shown at positions below the highest points of their movements. It will thus be seen that said levers have in their downward movements an initial idle stage during which they are without effect on the levers $t'$ and $t^2$ and the lever $s'$ is employed, during this idle stage, to operate a compressed air valve, which forms an element of the starting mechanism. The particular operation of this valve will be set forth in detail hereinafter.

For the reversal of the engine for permitting forward, backward and slow running, the valve-actuating shafts $w'$ and $w^2$ are adjusted by means of reversing rods $a'$ and $a^2$, adjusting levers $b'$ and $b^2$, reversing shafts $c'$ and $c^2$ keyed to these levers and the valve-actuating-shaft bearing-levers $d'$ and $d^2$ rigidly connected to these shafts. By these means, the gear-wheels $y'$ and $y^2$ of the valve-actuating shafts roll on the gear-wheels $x'$ and $x^2$ mounted coaxially with the reversing shafts $c'$, $c^2$. The valve-actuating shafts $w'$, $w^2$ are therefore both brought by the adjustment into another position, and also turned relatively to the crank-shafts of the engine. The reversing shafts $c'$ and $c^2$ are rotatably mounted in brackets $e'$ and $e^2$, which are screwed on to the frame of the machine. The valve-gear can be adjusted by means of a reversing engine, reversing lever or the like acting on the rods $a'$ and $a^2$.

The reversing mechanism for the exhaust-valve gearing is shown diagrammatically in Fig. 6, and the reversing mechanism for the admission-valve gearing in Fig. 7.

$a'$ is the reversing mechanism, $b'$ the adjusting lever, $d'$ the pair of levers carrying the valve-actuating shaft and $x'$ the gear-wheel as in Fig. 1. $y'\,v$, $y'\,m$ and $y'\,r$ give the positions of the gear-wheel $y'$ for "Forward," "Mid-position" and "Backward." $k\,v$, $k\,m$ and $k\,r$ give, for the same adjustments, the position of the crank circle for the valve-actuating shaft $w'$. $l'$ is the connecting rod and $s'$, $t'$ are the roller-levers in the lifted or closed position of the exhaust valve A. The circular arc struck with the radius $l'$ about the pivotal point $j'$ of the lever $s'$ cuts the crank circles $k\,v$, $k\,m$ and $k\,r$ at the points $1_v$; $2_v$; $1_m$, $2_m$ and $2_r$, $1_r$ and all points on these circles, which lie below the said circular arc, will be points for positions of the cranks of the valve-actuating shaft $w'$, at which the valve A is opened. All points lying above the said circular arc determine a closed valve A. The points $O_v$, $O_m$ and $O_r$ correspond to positions of the cranks carrying the valve-actuating shaft $w'$ for "Forward," "Mid-position and "Backward," when the piston is at the inner dead point between exhaust and drawing-in of the explosive mixture.

From Fig. 6, it will be seen that, in the direction of rotation shown for forward motion, the valve A by reason of the position of the point $1_v$ opens far enough in front of the inner dead point $o_v$ and closes shortly after $o_v$ at the point $2_v$. In the mid-position, the valve A is to open and to shut at the points $1_m$ and $2_m$, at the same distances from $O_m$. In the backward position, the gear-wheel $y_{1r}$ runs around in running backward in the direction indicated by the arrow, that is to say, in the opposite direction to $y_{1v}$ in running forward.

It will be seen that here again, as from $1_r$ the valve A opens sufficiently far in front of the inner dead point $O_r$ and is closed shortly after $o_r$ through $2_r$. The crank positions $1_v$ and $1_r$ correspond to cylinder-cranks of different position and the latter can be brought to the dead points by two similar but opposite rotations.

For the admission-valve-gear (Fig. 7) the conditions are similar to those in Fig. 6, except that the connecting rod $l_2$ is somewhat longer and the circular arc struck from $j^2$ with $l_2$ does not cut the middle crank circle $k_m$ in two points, but touches it only in the point $o_m$. Moreover the size of the crank circle is made such that now the points $2_v$ and $o_v$, and also $o_r$ and $2_r$ coincide. From the directions of rotation given, it further follows that the admission-valve, in all cases which need be considered in practice, is opened through the points $o_v$, $o_m$, $o_r$, etc., thus always at the inner dead points and closes differently according to the position of the circle $k$ for "Forward," "Backward," and "Running slowly" (running idle). Different charges extending down to zero can be given for running forward and backward.

Figs. 3, 4 and 5 show the compressed-air starting-gear. On the upper roller-lever $s'$ of the exhaust-valve actuating gear is screwed a driving piece $m$ which, in the downward travel of $s'$ and before the opening of the exhaust-valve, carries with it the pawl $k$ pivotally attached to the admission-valve $g$ for the compressed air. By reason of the motion of the engaging surface of $m$ in a circular arc, the pawl $k$ is released from $s'$ before the change of stroke, and the valve $g$ together with the pawl $k$ flies upward under the action of a compression-spring $f$, in order to close. In the upward travel of $m$ and $s'$, the pawl $k$ snaps behind $m$ again, for which purpose its motion is limited by a pin $o$, which is adjusted by means of a lever $p$ from the adjusting shaft $q$. If the pin $o$ is moved sufficiently far upward to the left, the pawl $k$ can be put completely out of action. For keeping the pawl $k$ against the pin $o$ a spring $i$ is provided. The compressed air flowing in through $g$ passes through the automatic compressed-air starting-valve $h$ into the combustion-chamber in the cylinder.

The reversal of the compressed-air starting device takes place simultaneously with the reversal of the exhaust-valve gear, for which purpose the compressed-air admission-valve $g$ is only actuated during the downward travel of the lever $s'$, and thus always before the opening of the exhaust-valve. The idle stroke of the roller-lever $s'$ is thus used for the opening of the compressed-air starting-valve.

In employing the above described gearing for steam-engines and compressors, the valve-actuating shafts must be rotated at the required speed. For the purpose of governing, the valve-actuating shafts must be adjusted by means of the governor.

What I claim is:—

1. A reversible valve-gear for fluid-pressure engines and the like, said valve-gear comprising a valve-actuating shaft, a rotatably mounted reversing shaft, lever-arms on said reversing shaft, bearings on said lever-arms for receiving said valve-actuating shaft, a gear-wheel fixed on said valve-actuating shaft, a gear-wheel rotatably mounted coaxially with said reversing shaft and engaging with the gear-wheel on said valve-actuating shaft, a crank on said valve-actuating shaft, a valve, a pair of roller-levers operatively connected to said valve and a connecting rod coupling said crank and the driving member of said pair of roller-levers.

2. A reversible valve-gear for fluid-pressure engines and the like, said valve-gear comprising a valve-actuating shaft, a rotatably mounted reversing shaft, lever-arms on said reversing shaft, bearings on said lever-arms for receiving said valve-actuating shaft, a gear-wheel fixed on said valve-actuating shaft, a gear-wheel rotatably mounted coaxially with said reversing shaft and engaging with the gear-wheel on said valve-actuating shaft, a crank on said valve-actuating shaft, a valve, a pair of roller-levers operatively connected to said valve, a connecting rod coupling said crank and the driving member of said pair of roller-levers, a second valve and means combined with the driving member of said pair of roller-levers for actuating the second valve during the idle stroke of the driving member of said roller-levers.

3. A reversible valve-gear for fluid-pressure engines and the like, said valve-gear comprising a valve-actuating shaft, a rotatably mounted reversing shaft, lever-arms on said reversing shaft, bearings on said lever-arms for receiving said valve-actuating shaft, a gear-wheel fixed on said valve-actuating shaft, a gear-wheel rotatably mounted coaxially with said reversing shaft and engaging with the gear-wheel on said valve-actuating shaft, a crank on said valve-actuating shaft, a valve, a pair of roller-levers operatively connected to said valve, a connecting rod coupling said crank and the driving member of said pair of roller-levers, a driving piece mounted on the driving member (lever) of said pair of roller-levers, a second valve, means for yieldingly holding said valve in one position and a pawl pivotally connected to said second valve and guided to engage said driving piece during part only of the travel of said driving piece in its arc-shaped path.

4. A reversible valve-gear for fluid-pressure engines and the like, said valve-gear comprising a valve-actuating shaft, a rotatably mounted reversing shaft, lever-arms on said reversing shaft, bearings on said lever-arms for receiving said valve-actuating shaft, a gear-wheel fixed on said valve-actuating shaft, a gear-wheel rotatably mounted coaxially with said reversing shaft and engaging with the gear-wheel on said valve-actuating shaft, a crank on said valve-actuating shaft, a valve, a pair of roller-levers operatively connected to said valve, a connecting rod coupling said crank and the driving member of said pair of roller-levers, a driving piece mounted on the driving member (lever) of said pair of roller-levers, a second valve, means for yieldingly holding said valve in one position, a pawl pivotally connected to said second valve and guided to engage said driving piece during part only of the travel of said driving piece in its arc-shaped path, and an adjustable crank pin for holding said pawl out of the path of said driving piece.

5. A reversing valve gear for elastic fluid engines comprising a crank shaft, a pair of roller levers for operating the engine valve, a connection between the crank shaft and the roller levers, means for driving the crank shaft and means for adjustably moving the crank shaft in an arc-like path.

6. In a reversing valve gear for elastic fluid engines, a pair of roller levers for operating the engine valve, one of the levers acting on the other and having an initial idle stage of movement, a compressed air starting valve for the engine and means whereby the actuating lever causes the opening of the valve during its idle stage of movement.

In testimony whereof I have hereunto set my hand in presence of two subscribing witnesses.

RUDOLF HENNIG.

Witnesses:
ERNEST H. L. MUMMENHOFF,
IDA CHR. HAFERMANN.